United States Patent
Jayaraman et al.

(10) Patent No.: US 9,600,490 B2
(45) Date of Patent: Mar. 21, 2017

(54) INTELLIGENT DEDUPLICATION DATA PREFETCHING

(71) Applicant: Quest Software Inc., Aliso Viejo, CA (US)

(72) Inventors: Vinod Jayaraman, San Francisco, CA (US); Ratna Manoj Bolla, Hyderabad (IN)

(73) Assignee: Quest Software Inc., Aliso Viejo, CA (US)

( * ) Notice: Subject to any disclaimer, the term of this patent is extended or adjusted under 35 U.S.C. 154(b) by 332 days.

(21) Appl. No.: 14/311,485

(22) Filed: Jun. 23, 2014

(65) Prior Publication Data

US 2014/0310251 A1    Oct. 16, 2014

Related U.S. Application Data

(63) Continuation of application No. 13/182,951, filed on Jul. 14, 2011, now Pat. No. 8,762,349.

(51) Int. Cl.
*G06F 17/30*    (2006.01)
*G06F 3/06*    (2006.01)

(52) U.S. Cl.
CPC ...... *G06F 17/30156* (2013.01); *G06F 3/0641* (2013.01); *G06F 17/30159* (2013.01)

(58) Field of Classification Search
None
See application file for complete search history.

(56) References Cited

U.S. PATENT DOCUMENTS

| | | | |
|---|---|---|---|
| 8,250,325 B2 | 8/2012 | Holdman et al. |
| 8,280,860 B2 | 10/2012 | Spackman et al. |
| 8,290,972 B1 | 10/2012 | Deshmukh et al. |
| 8,762,349 B2 | 6/2014 | Jayaraman et al. |
| 2011/0167221 A1 | 7/2011 | Pangal et al. |
| 2011/0246741 A1 | 10/2011 | Raymond et al. |
| 2012/0084261 A1 | 4/2012 | Parab |
| 2012/0173822 A1 | 7/2012 | Testardi et al. |
| 2013/0018851 A1 | 1/2013 | Jayaraman et al. |

*Primary Examiner* — Jay Morrison
(74) *Attorney, Agent, or Firm* — Kwan & Olynick LLP

(57) ABSTRACT

Deduplication dictionaries are used to maintain data chunk identifier and location pairings in a deduplication system. When access to a particular data chunk is requested, a deduplication dictionary is accessed to determine the location of the data chunk and a datastore is accessed to retrieve the data chunk. However, deduplication dictionaries are large and typically maintained on disk, so dictionary access is expensive. Techniques and mechanisms of the present invention allow prefetches or read aheads of datastore (DS) headers. For example, if a dictionary hit results in datastore DS(X), then headers for DS(X+1), DS(X+2), DS(X+read-ahead-window) are prefetched ahead of time. These datastore headers are cached in memory, and indexed by datastore identifier. Before going to the dictionary, a lookup is first performed in the cached headers to reduce deduplication data access request latency.

20 Claims, 6 Drawing Sheets

Figure 2A

| Object Map File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| | Data Table 251 | |
| Index 253 | Data Offset 255 | Data Reference Count 257 |
| 1 | Offset-Data Chunk A | 1 |
| 2 | Offset-Data Chunk B | 1 |
| 3 | Offset-Data Chunk C | 1 |
| | Datastore | |
| | Data 261 | Last File 263 |
| 1 | Data Chunk A | File X 201 |
| 2 | Data Chunk B | File X 201 |
| 3 | Data Chunk C | File X 201 |

Figure 3

| Dictionary 301 ||
|---|---|
| Fingerprint 311 | Storage Location 321 |
| a | Location 323 |
| b | Location 325 |
| c | Location 327 |

| Dictionary 351 ||
|---|---|
| Fingerprint 361 | Storage Location 371 |
| i | Location 373 |
| j | Location 375 |
| k | Location 377 |

INTELLIGENT DEDUPLICATION DATA PREFETCHING

CROSS-REFERENCE TO RELATED APPLICATIONS

This application claims benefit under 35 U.S.C. §120 to U.S. application Ser. No. 13/182,951 filed Jul. 14, 2011 and titled "INTELLIGENT DEDUPLICATION DATA PREFETCHING", issued as U.S. Pat. No. 8,762,349, the entirety of which is incorporated herein by reference for all purposes.

TECHNICAL FIELD

The present disclosure relates to intelligent deduplication data prefetching.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across objects such as files to increase storage, transmission, and/or processing efficiency. A storage system which incorporates deduplication technology involves storing a single instance of a data chunk that is common across multiple objects. In some examples, data sent to a storage system is delineated into fixed or variable sized chunks. Each chunk is provided with a fingerprint such as a hash or checksum of the chunk data. Once the fingerprint is generated, it can be used to determine if the data chunk already exists in the system. If the data chunk does exist, it need not be stored again.

In many implementations, chunks are referenced using deduplication dictionaries and object maps and may be stored on a number of systems. Determining where the chunk is stored and subsequently accessing the chunk can entail significant latency and delay. Consequently, mechanisms are provided to allow for improved data access.

BRIEF DESCRIPTION OF THE DRAWINGS

The disclosure may best be understood by reference to the following description taken in conjunction with the accompanying drawings, which illustrate particular embodiments of the present invention.

FIG. 2A illustrates a particular example of an object map.

FIG. 2B illustrates a particular example of a datastore suitcase.

FIG. 3 illustrates a particular example of a dictionary.

DESCRIPTION OF PARTICULAR EMBODIMENTS

Figure 1:
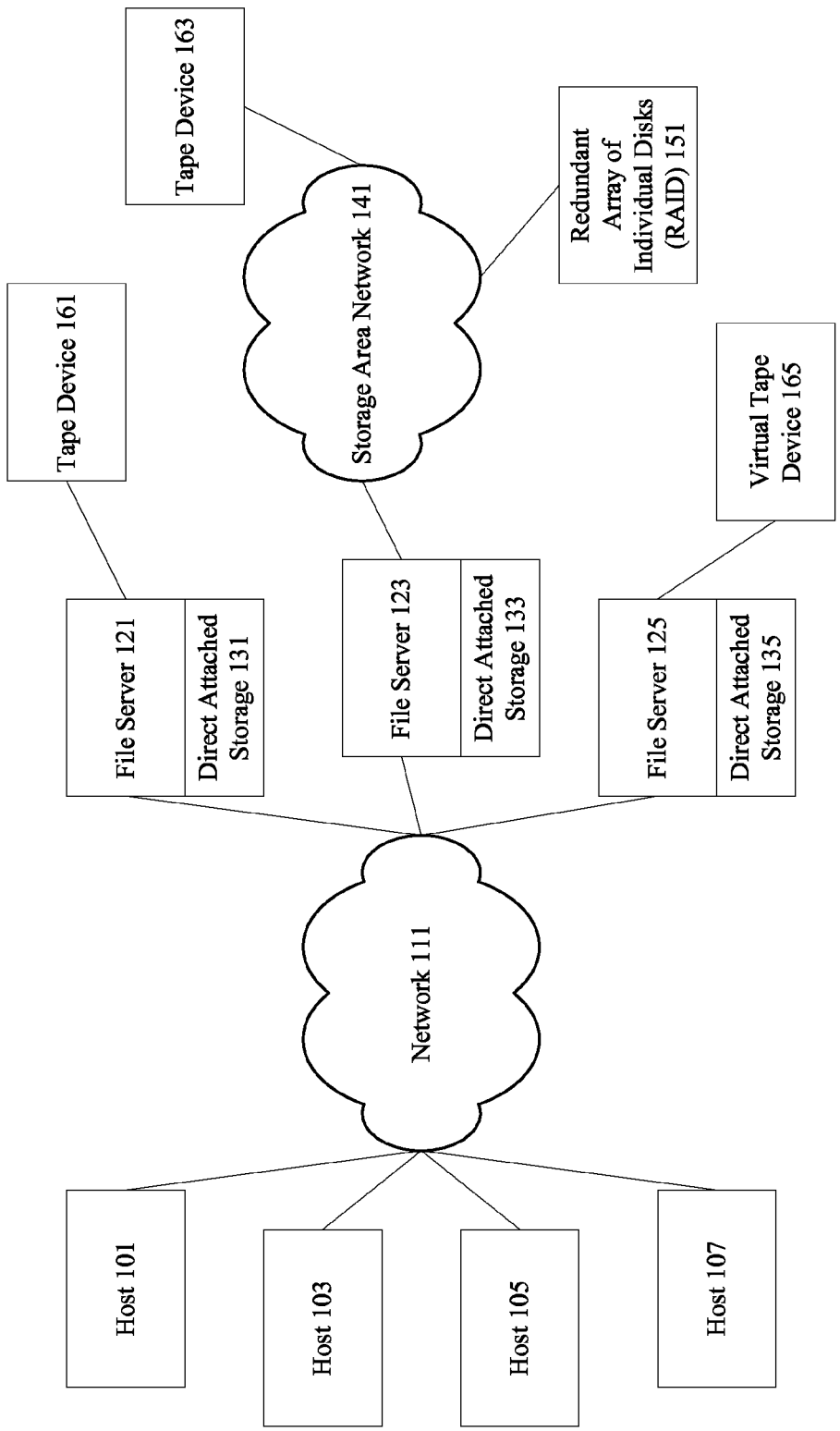
FIG. 1 illustrates a particular example of network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular deduplication system nodes and network interfaces. However, it should be noted that the techniques and mechanisms of the present invention apply to a variety of different deduplication system nodes and network interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Deduplication dictionaries are used to maintain data chunk identifier and location pairings in a deduplication system. When access to a particular data chunk is requested, a deduplication dictionary is accessed to determine the location of the data chunk and a datastore is accessed to retrieve the data chunk. However, deduplication dictionaries are large and typically maintained on disk, so dictionary access is expensive. Techniques and mechanisms of the present invention allow prefetches or read aheads of datastore (DS) headers. For example, if a dictionary hit results in datastore DS(X), then headers for DS(X+1), DS(X+2), DS(X+read-ahead-window) are prefetched ahead of time. These datastore headers are cached in memory, and indexed by datastore identifier. Before going to the dictionary, a lookup is first performed in the cached headers to reduce deduplication data access request latency.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data.

Deduplication may involve identifying variable or fixed sized chunks. According to various embodiments, each chunk of data may be fingerprinted using a hash algorithm such as MD5 or SHA-1. This process generates an identifier for each chunk. If a file is updated, only the changed data may be saved. That is, if only a few bytes of a document or presentation are changed, only changed portions are saved. In some instances, deduplication searches for matching sequences using a fixed or sliding window and uses references to matching sequences instead of storing the matching sequences again.

According to various embodiments, deduplication systems include dictionaries, object maps, and datastore suitcases. A dictionary is a file that contains the chunk identifiers and location pairs. The chunk identifiers can be created by using a checksum or a hashing mechanism like MD5 or SHA. Since the dictionary can grow into a large file (>1 TB) it must be organized in a way that makes it readily searchable. Organizing the identifier/location pairs in a binary tree is one approach which can be used to accelerate searches. Each deduplication system node in a network can have its own dictionary.

In particular embodiments, object maps are regular files which hold index mappings for deduplicated files. Object maps are used to reference all data chunks for the associated object or file whether the chunks are common to other files or unique. A datastore suitcase holds the actual data chunks for the deduplicated files. Each data chunk has a reference count associated with it. The reference count specifies the number of object map entries which are referencing the data chunk. When the reference count is zero, a cleaner application can delete the entry from the suitcase. It should be noted that the metadata is grouped together before the data chunks. The datastore suitcase includes a header having a unique datastore identifier as well as metadata length and offset information. The datastore identifier may be used to find associated datastore suitcases. The header also includes the location of the next available offset for additional metadata entries.

With the dictionary, object maps, and datastore suitcases, a file system independent layout for storing and referencing deduplicated data can be implemented.

According to various embodiments, a de-duplication mechanism must be able to guarantee that data chunks that are not identical will hash to a different value. If this is not the case, data loss may occur. To do this it is necessary to use a strong hash value which has a statistically negligible probability of collision. However, such hash values are computationally expensive and require more bytes to represent them. Consequently, dictionaries can reach significant size when chunks are sized appropriately to find duplicates and fingerprints are sufficiently unique. The dictionary may reach a size where it cannot be maintained entirely in process memory. Accessing a dictionary entry would require persistent storage access, such as disk access.

In many implementations, it would be desirable to implement a caching scheme for the dictionary so that disk access can be reduced. However, good fingerprinting mechanisms such as good hashing algorithms produce uniformly distributed keys, preventing implementing of effective caching schemes for the dictionary.

Consequently, the techniques and mechanisms of the present invention recognize that a bottleneck in deduplication performance is dictionary lookups and provide mechanisms for reducing and/or avoiding dictionary lookups.

According to various embodiments, when data is received for storage in a deduplication system, data is organized into collections of chunks referred to herein as datastores. According to various embodiments, datastores are identified using a datastore identifier or (DSID). In particular embodiments, the DSID is a monotonically increasing number. According to various embodiments, the DSIDs of various datastores identify relationships between datastores. For example, datastores sharing an 8-bit subsequence may all be associated with ingestion of a particular file.

According to various embodiments, when data is ingested into a deduplication system, data is written to an open data store. If a datastore is full, then the system allocates a new datastore with DSID related to the previous datastore DSID. In particular examples, the new datastore DSID is one greater than the previous datastore DSID. In particular embodiments, if 8 MB of an incoming stream is written into datastore 1, then the following bytes in the stream will be written in datastore 2. This scheme allows prefetches or read aheads of datastore (DS) headers. For example, if a dictionary hit results in datastore DS(X), then headers for DS(X+1), DS(X+2), DS(X+read-ahead-window) are prefetched ahead of time. These datastore headers are cached in memory, and indexed by datastore ID. Before going to the dictionary, a lookup is first performed in the cached headers.

In particular embodiments, a 24 MB stream may get split into DS 1, DS 2, and DS 3. When a duplicate stream in re-ingested, the first chunk will get a hit in the dictionary in DS 1. This will trigger population of the DS header from DS 1 and prefetch headers from DS 2 and DS 3. Future lookups will be entirely serviced from the DS cache in memory without access to the dictionary on disk.

FIG. 1 illustrates a particular example of a network that can use the techniques and mechanisms of the present invention. Hosts 101, 103, 105, and 107 are connected to file servers 121, 123, and 125 through a network 111. Hosts may include computer systems, application servers, devices, etc. A network 111 may be a single network or a combination of different networks. According to various embodiments, each host 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, hosts 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow hosts 101, 103, 105, and 107 to access data at the file level. The file servers 121, 123, and 125 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a fingerprint index may be implemented at hosts 101, 103, 105, and 107, at network 111, or at file servers 121, 123, and 125 or at a combination of entities. The fingerprint generator intercepts requests to store a data chunk and determines whether the data chunk has already been stored at a target system. For example, if a client associated with host 101 requests deduplication of multiple files in a directory, the fingerprint generator determines what chunks in the multiple files have already been deduplicated. For chunks already deduplicated, references and reference counts may be updated, but the data chunks need not be transmitted again to the target system for deduplication. The determination can be made by comparing fingerprints of chunks for deduplication.

FIG. 2A illustrates a particular example of a mechanism for delineating data chunks. FIG. 2B illustrates a particular example of a mechanism for managing data chunks. It should be noted that although a particular mechanism is described, a wide variety of mechanisms can be used. According to various embodiments, object map file X 201 includes offset 203, index 205, and lname 207 fields. In particular embodiments, each chunk in the object map for file X is 8K in size. In particular embodiments, each data chunk has an index of format <Datastore Suitcase ID>. <Data Table Index>. For example, 0.1 corresponds to suitcase ID 0 and datatable index 1, while 2.3 corresponds to suitcase ID 2 and database index 3. The chunks corresponding to offsets 0K, 8K, and 16K all reside in suitcase ID 0 while the data table indices are 1, 2, and 3. The lname field 207 is NULL in the object map because each chunk has not previously been referenced by any file.

FIG. 2B illustrates one example of a datastore suitcase corresponding to the object map file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 251 includes three offset reference count pairs which map to the data chunks of the object map file X 201. In the index portion, index 1 corresponding to data in offset-data chunk A has been referenced once. Index 2 corresponding to data in offset-data chunk B has been referenced once. Index 3 corresponding to data in offset-data chunk C has been referenced once. In the data portion, index 1 includes data chunk A and a reference to File X 201 which was last to place a reference on the data chunk A. Index 2 includes data chunk B and a reference to File X 201 which was last to place a reference on the data chunk B. Index 3 includes data chunk C and a reference to File X 201 which was last to place a reference on the data chunk C.

FIG. 3 illustrates multiple dictionaries assigned to different fingerprints. According to various embodiments, the fingerprints values are checksums, SHA/SHA1/SHA-256 hash values. In particular embodiments, dictionary 301 is a deduplication dictionary used by a first node and includes fingerprint ranges from 0x0000 0000 0000 0000-0x0000 0000 FFFF FFFF. Dictionary 351 is used by a second node and includes fingerprint ranges from 0x0000 0001 0000 0000-0X0000 0001 FFFF FFFF. Fingerprints 311 within the range for dictionary 301 are represented by symbols a, b, and c for simplicity. Fingerprints 361 within the range for dictionary 351 are represented by symbols i, j, and k for simplicity. According to various embodiments, each fingerprint in dictionary 301 is mapped to a particular storage location 321 such as location 323, 325, or 327. Each fingerprint in dictionary 351 is mapped to a particular storage location 371 such as location 373, 375, and 377.

Having numerous small chunks increases the likelihood that duplicates will be found. However, having numerous small chunks decreases the efficiency of using the dictionary itself as well as the efficiency of using associated object maps and datastore suitcases.

Figure 4:
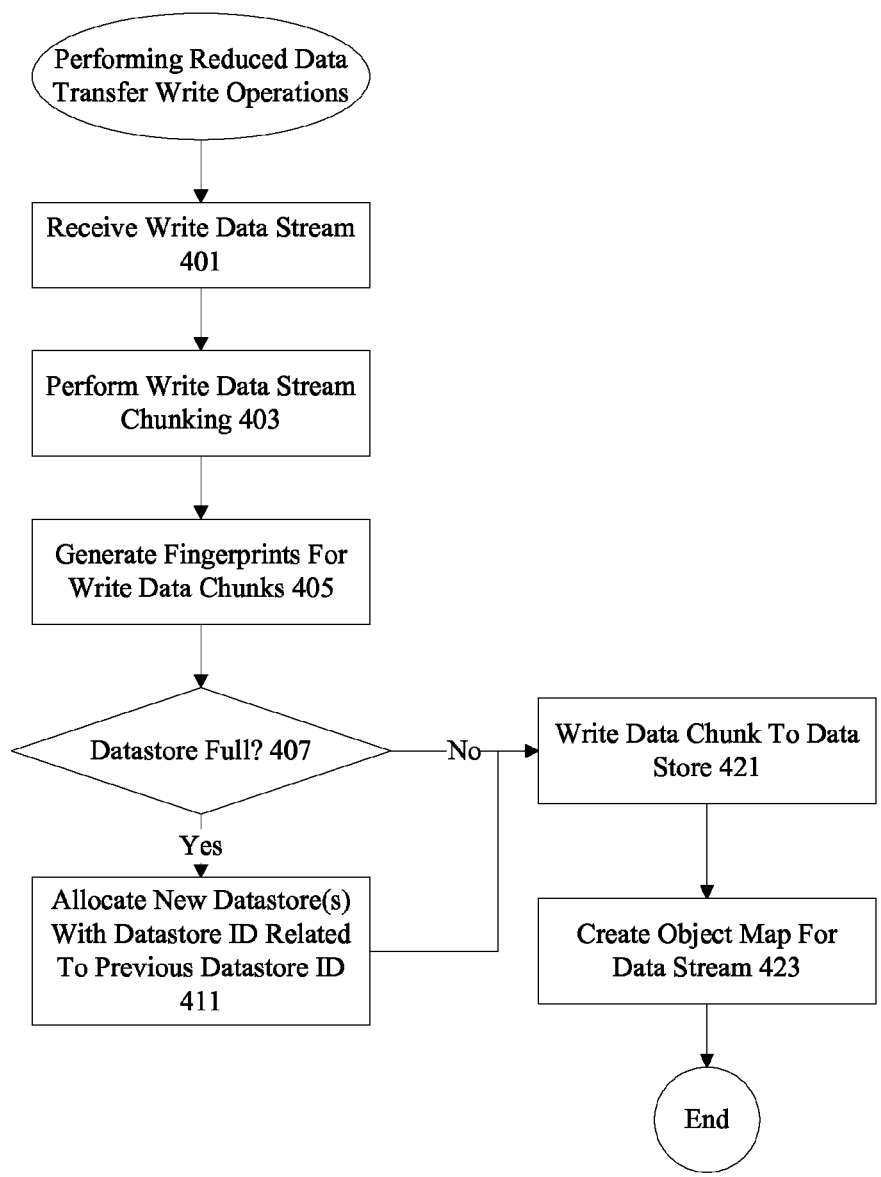
FIG. 4 illustrates a particular example of a technique for performing reduced data transfer write operations.

FIG. 4 illustrates a particular example of a technique for ingesting data. According to various embodiments, a deduplication system node receives a write data stream at 401. In particular embodiments, the deduplication system node performs write data stream chunking at 403. The deduplication system node may divide the write data stream into fixed size chunks or variable size chunks. The deduplication system node may also perform analysis to identify chunk boundaries. In particular embodiments, the data stream is divided into chunks to allow for deduplication, although chunking may also be useful in a variety of other applications. At 405, fingerprints are generated for the chunks. Fingerprints may be checksums, hash values, or any other sequence that can be used to identify individual chunks.

According to various embodiments, it is determined if an open datastore has sufficient space for one or more write data chunks. If the datastore is full at 407, one or more new datastores will have to be allocated at 411. According to various embodiments, the new stores have DSIDs that are monotonically increasing. In particular embodiments, the new datastores have datastore identifiers that relate to the most recently open datastore. If the datastore is not full at 407, the one or more data chunks are written to the datastore at 421. According to various embodiments, an object map is created for the datastream at 423.

Figure 5:
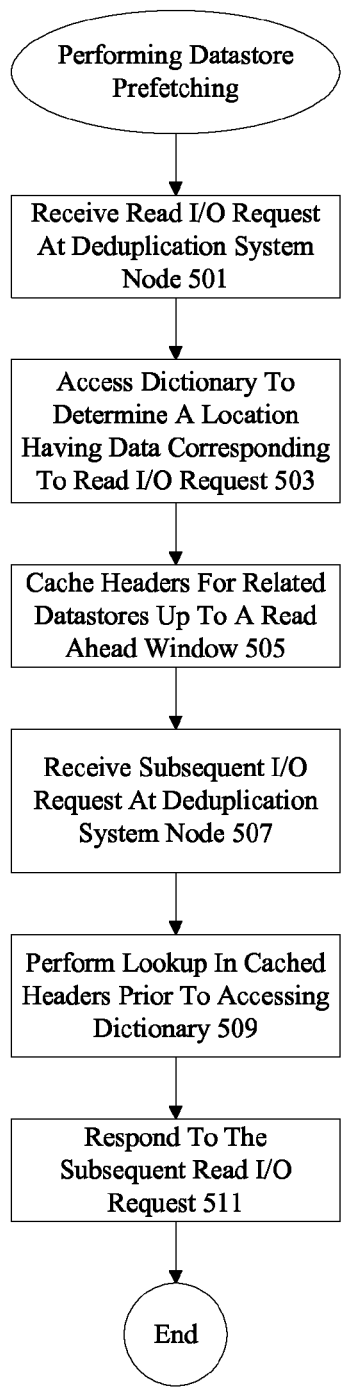
FIG. 5 illustrates a particular example of a technique for performing reduced data transfer read operations.

FIG. 5 illustrates a particular example of a technique for performing prefetching. According to various embodiments, a read I/O request for an object is received at a deduplication system node at 501. According to various embodiments, the deduplication system node accesses a deduplication dictionary to determine a location having data corresponding to the read I/O request at 503. According to various embodiments, a datastore corresponding to the read I/O request is cached. In particular embodiments, datastore headers for the datastore and related datastores are cached at 505.

According to various embodiments, 24 MB stream may get split into DS 1, DS 2, and DS 3. When a duplicate stream in re-ingested, the first chunk will get a hit in the dictionary in DS 1. This will trigger caching of the DS header from DS 1 and prefetch headers from DS 2 and DS 3. Future lookups will be entirely serviced from the DS cache in memory without access to the dictionary on disk. In particular embodiments, a subsequence I/O request is received at deduplication system node at 507. A lookup is performed in cached headers prior to accessing a dictionary at 509. The deduplication system node can respond to the read I/O request at 511.

Figure 6:
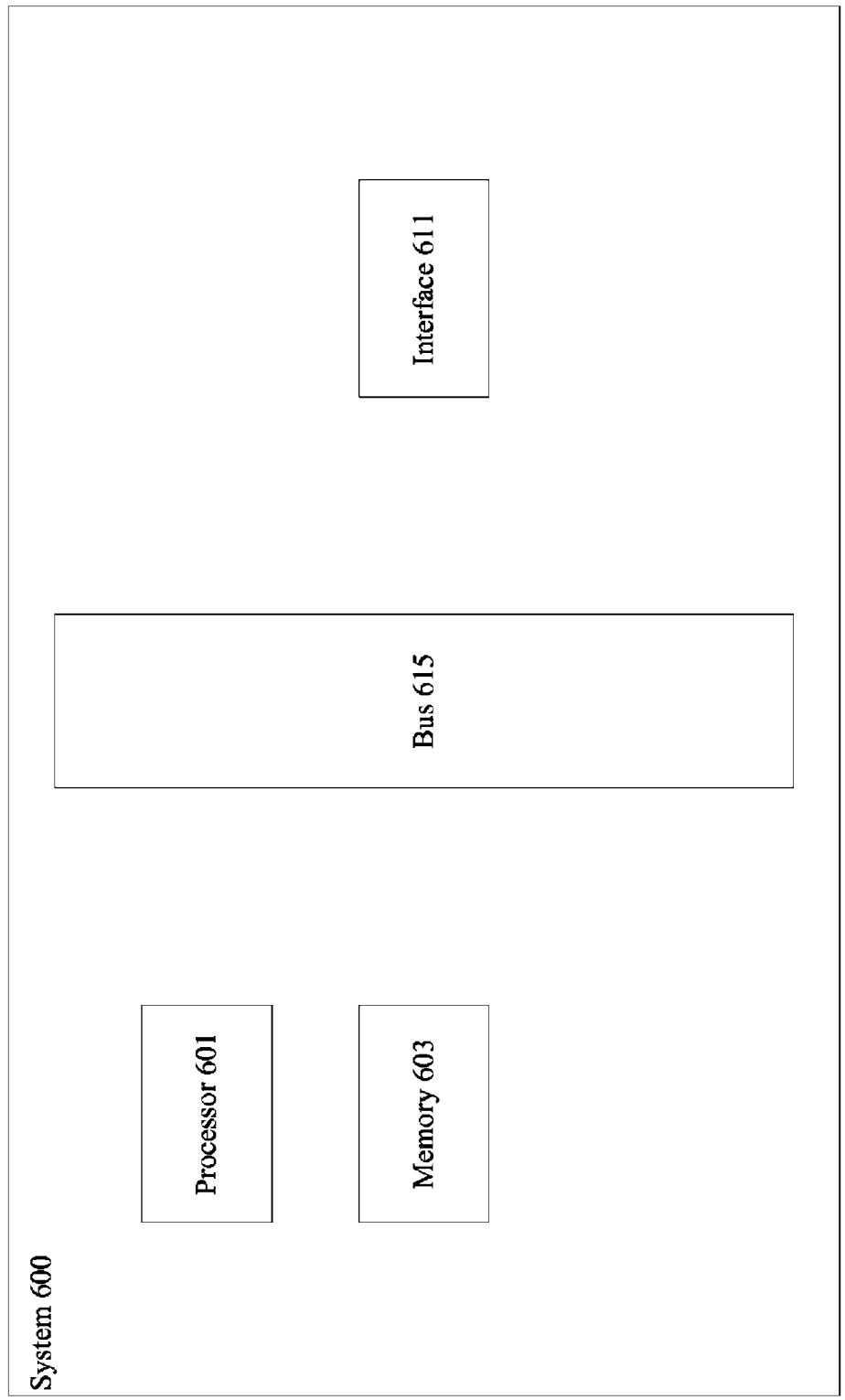
FIG. 6 illustrates a particular example of a computer system.

A variety of devices and applications can implement particular examples of the present invention. FIG. 6 illustrates one example of a computer system. According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data chunks over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
receiving a first input/output (I/O) request at a deduplication system node;
performing a first lookup in a cache before accessing a deduplication dictionary;
accessing the deduplication dictionary to determine a first location having data corresponding to the read I/O request;
maintaining in the cache a plurality of headers for a plurality of datastores related to the first location, wherein the cache is configured to maintain the plurality of headers for the plurality of datastores related to the first location upon receiving the read I/O request associated with a single datastore at the first location;
receiving a second I/O request at the deduplication system node;
performing a second lookup in cache before accessing the deduplication dictionary;
responding to the second I/O request without accessing the deduplication dictionary.

2. The method of claim 1, wherein a number of headers cached corresponds to a read ahead window.

3. The method of claim 1, wherein the plurality of datastores are determined to be related to the first location if datastore identifiers of the plurality of datastores are monotonically increasing up to a read ahead window from a first datastore identifier associated with the first location.

4. The method of claim 3, wherein the read ahead window identifies a number of datastore headers to cache.

5. The method of claim 3, wherein if accessing the deduplication dictionary identifies datastore X, then headers for datastore (X+1) through datastore (X+read ahead window) are prefetched ahead of time.

6. The method of claim 1, wherein related datastores are created during ingestion of a particular file.

7. The method of claim 1, wherein the deduplication dictionary maintains mappings between a plurality of fingerprints and a plurality of storage locations.

8. The method of claim 7, wherein the plurality of fingerprints are a plurality of hash values corresponding to a plurality of deduplicated data chunks.

9. The method of claim 7, wherein the plurality of fingerprints are a plurality of checksums corresponding to a plurality of deduplicated data chunks.

10. A system, comprising:
a hardware processor;
an interface configured to receive an first input/output (I/O)request and a second (I/O) request at a deduplication system node;
a deduplication dictionary configured to provide a first location having data corresponding to the first I/O request;
a cache configured to maintain a plurality of headers for a plurality of datastores related to a first location after a first lookup is performed, wherein cache is configured to maintain the plurality of headers for the plurality of datastores related to the first location upon receiving the read I/O request associated with a single datastore at the first location, wherein the cache provides response data for the deduplication system node to respond to the second I/O request without accessing the deduplication dictionary.

11. The system of claim 10, a number of headers cached corresponds to a read ahead window.

12. The system of claim 10, wherein the plurality of datastores are determined to be related to the first location if datastore identifiers of the plurality of datastores are monotonically increasing up to a read ahead window from a first datastore identifier associated with the first location.

13. The system of claim 12, wherein the read ahead window identifies a number of datastore headers to cache.

14. The system of claim 12, wherein if accessing the deduplication dictionary identifies datastore X, then headers for datastore (X+1) through datastore (X+read ahead window) are prefetched ahead of time.

15. The system of claim 10, wherein related datastores are created during ingestion of a particular file.

16. The system of claim 10, wherein the deduplication dictionary maintains mappings between a plurality of fingerprints and a plurality of storage locations.

17. The system of claim 16, wherein the plurality of fingerprints are a plurality of hash values corresponding to a plurality of deduplicated data chunks.

18. The system of claim 16, wherein the plurality of fingerprints are a plurality of checksums corresponding to a plurality of deduplicated data chunks.

19. A non-transitory computer readable medium, comprising:
   computer code for receiving a first input/output (I/O) request at a deduplication system node;
   computer code for performing a first lookup in a cache before accessing a deduplication dictionary;
   computer code for accessing the deduplication dictionary to determine a first location having data corresponding to the read I/O request;
   computer code for maintaining in the cache a plurality of headers for a plurality of datastores related to the first location, wherein the cache is configured to maintain the plurality of headers for the plurality of datastores related to the first location upon receiving the read I/O request associated with a single datastore at the first location;
   computer code for receiving a second I/O request at the deduplication system node;
   computer code for performing a second lookup in cache before accessing the deduplication dictionary;
   computer code for responding to the second I/O request without accessing the deduplication dictionary.

20. The non-transitory computer readable medium of claim 19, wherein a number of headers cached corresponds to a read ahead window.

* * * * *